United States Patent [19]
Russell

[11] Patent Number: 5,673,813
[45] Date of Patent: Oct. 7, 1997

[54] CANDY-DISPENSING DEVICE

[75] Inventor: Douglas Raymond Russell, Louisville, Ky.

[73] Assignee: Cap Toys, Inc., Bedford Heights, Ohio

[21] Appl. No.: 524,786

[22] Filed: Sep. 7, 1995

[51] Int. Cl.⁶ .................................................. B65H 3/60
[52] U.S. Cl. .................................. 221/203; 273/144 A
[58] Field of Search ............................... 221/115, 202, 221/203, 200, 254, 258, 255, 277, 265; 273/144 R, 144 A, 144 B

[56] References Cited

U.S. PATENT DOCUMENTS

| | | | |
|---|---|---|---|
| D. 264,595 | 5/1982 | Lyons | D15/111 |
| D. 290,005 | 5/1987 | O'Rourke | D14/53 |
| D. 316,276 | 4/1991 | Weiner | D20/3 |
| D. 333,681 | 3/1993 | Stern | D20/7 |
| 625,179 | 5/1899 | Lyons | 46/38 |
| 1,227,031 | 5/1917 | Bartholomew | 273/144 R |
| 2,135,606 | 11/1938 | Struve | 272/31 |
| 2,606,088 | 8/1952 | Leaf | 221/155 |
| 2,627,698 | 2/1953 | Wood | 46/39 |
| 2,731,767 | 1/1956 | Holt | 446/38 |
| 2,759,632 | 8/1956 | Ussery et al. | 221/155 |
| 2,766,123 | 10/1956 | Moubayed | 426/132 |
| 2,799,587 | 7/1957 | Schwartz | 446/236 |
| 2,874,496 | 2/1959 | Rakes | 40/28.3 |
| 3,054,217 | 9/1962 | D'Amato | 46/243 |
| 3,077,254 | 2/1963 | Goldfarb | 46/243 |
| 3,615,596 | 10/1971 | Petti | 426/132 |
| 3,679,208 | 7/1972 | Carrano, Jr. et al. | 273/954 |
| 3,810,629 | 5/1974 | Yamamoto | 273/144 A |
| 4,858,933 | 8/1989 | Mink | 221/203 |
| 4,961,578 | 10/1990 | Chateau | 273/144 R |
| 5,004,122 | 4/1991 | Poynter | 221/155 |
| 5,209,692 | 5/1993 | Coleman et al. | 446/71 |

OTHER PUBLICATIONS

Spin Pop® Candy, by Cap Toys, Inc., Oct. 1993.
Screw Ups® Candy Dispenser, by Cap Toys, Inc., Feb. 1995.

*Primary Examiner*—Kenneth Noland
*Attorney, Agent, or Firm*—Laff, Whitesel, Conte & Saret, Ltd.

[57] ABSTRACT

A candy dispensing device uses an impeller to impart centrifugal force to a mass of candies held in the dispenser's housing. The swirling mass of candies may be a source of amusement to the user and may be used to dispense the candies through a spout. In one version of the invention, the dispensing device includes a handle and is sized to be portable by the user. The dispensing device uses a combination cap with two cap portions, one to cover the fill mouth, and the other to cover the spout.

19 Claims, 2 Drawing Sheets

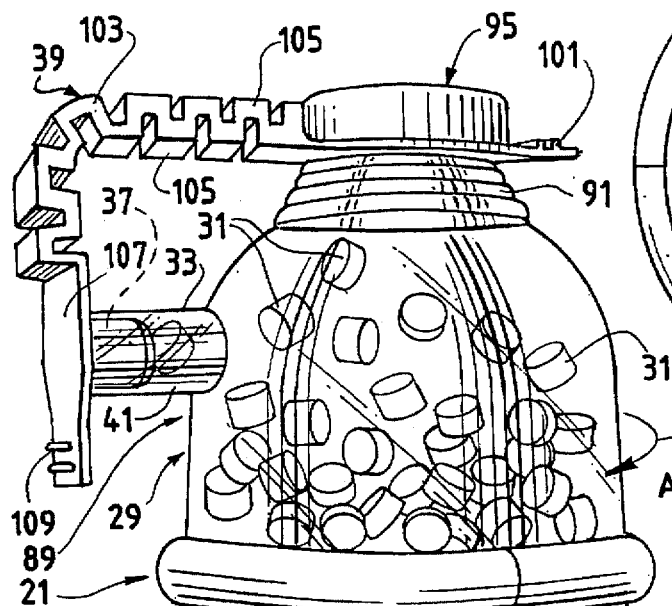
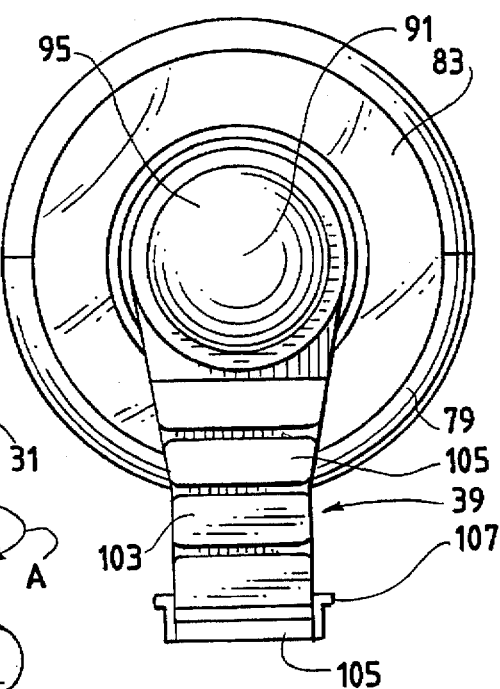
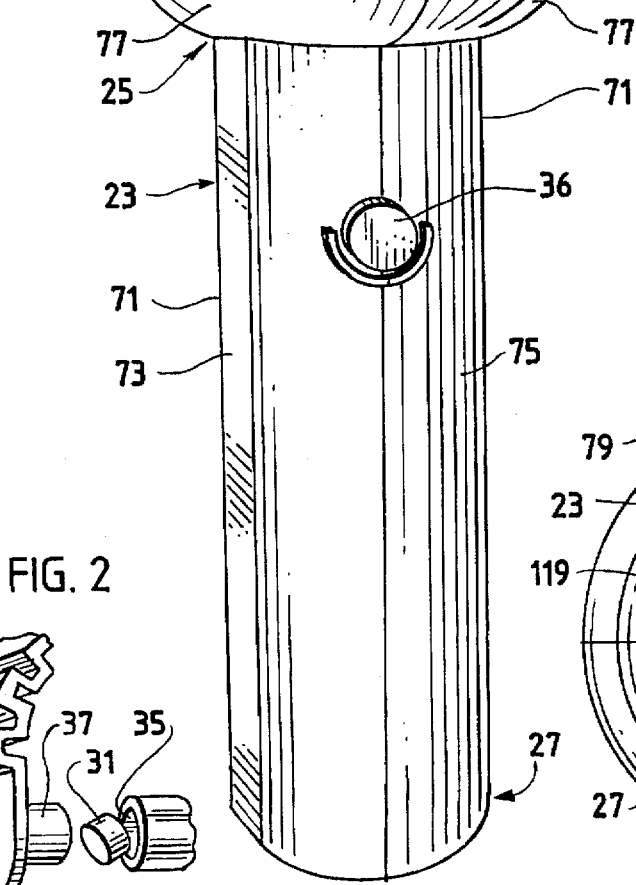
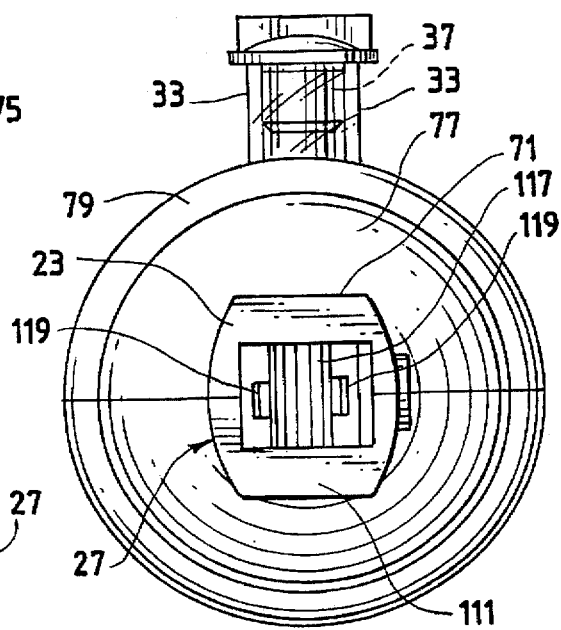

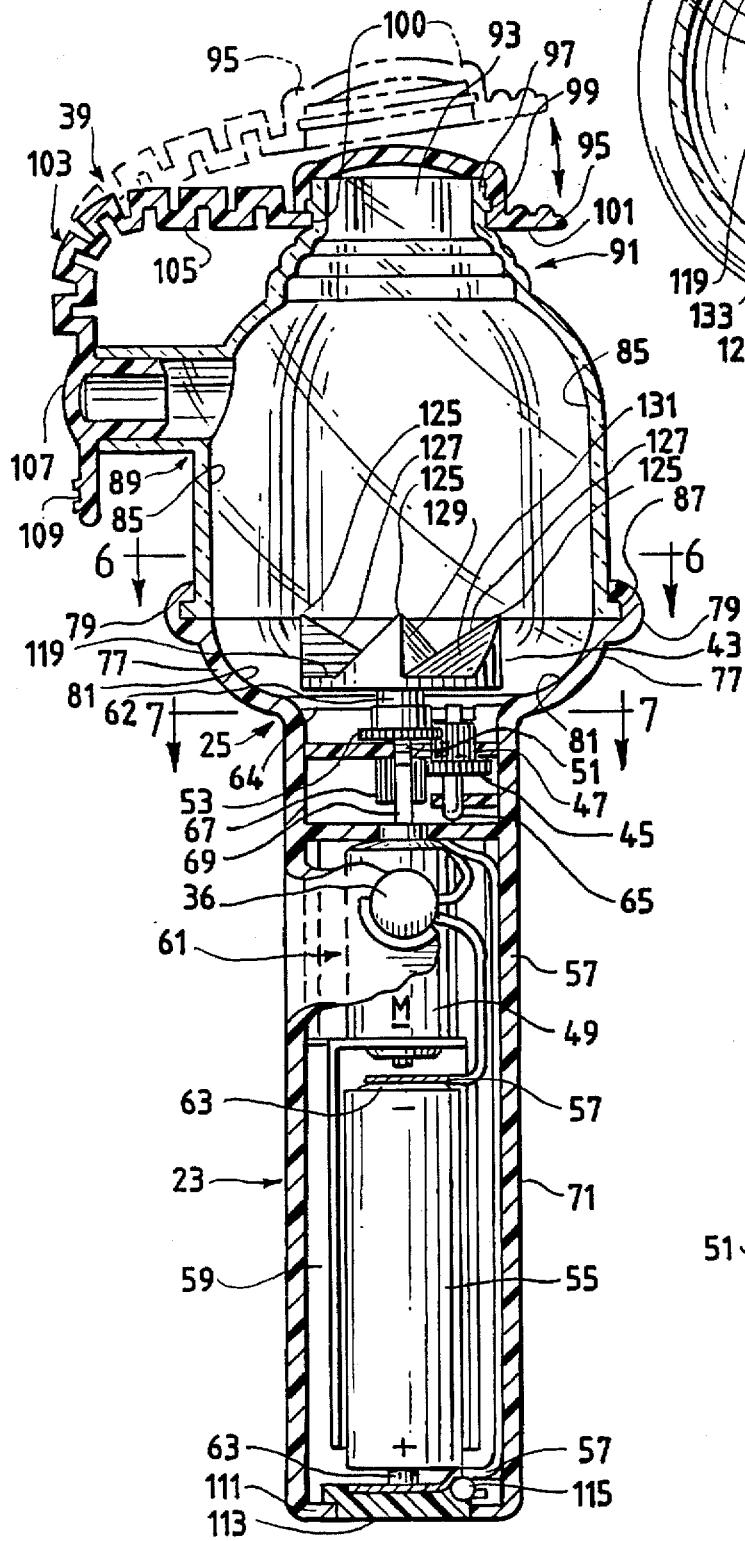
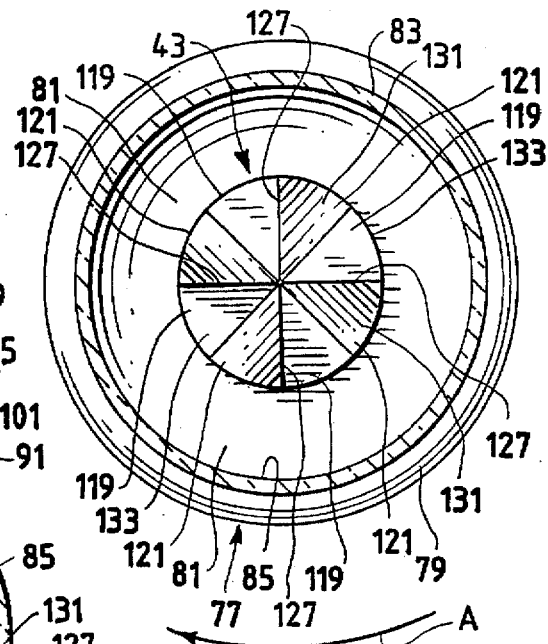
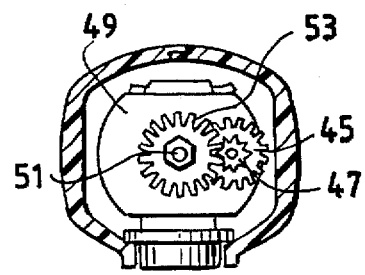

CANDY-DISPENSING DEVICE

This invention relates to candy-dispensing devices, and more particularly, to a candy-dispensing device which makes use of centrifugal force.

BACKGROUND

Candy-dispensing devices known in the art include gumball machines, candy vending machines, and more portable, personal dispensers such as those used with the PEZ product. The gumball machine, as is well known, has an enclosure, generally of transparent material, for storing the gumballs or other candy. A dispensing mechanism in these machines allows the candy-seeker to insert a coin, activate a handle, and receive candy from the enclosure. Such gumball machines exist in commercial versions for use at retailers and also in home versions.

Gumball machines have been combined with various games, such as those shown in U.S. Pat. Nos. 2,606,088 to Leaf; 2,759,632 to Ussery; and 3,077,254 to Goldfarb. These gumball machines suffer from various drawbacks and disadvantages. One disadvantage is that these machines are generally mechanically complex, making them costly to manufacture and generally ill-suited for personal use. Thus, the candy-seeker is deprived of any amusement and candy from such dispensing machines except when the candy-seeker visits a retailer where such machines have been purchased and installed.

Gumball machines have also incorporated various ornamental shapes or sculptures, such as the locomotive shown in Weiner U.S. Pat. No. D 316,276 and the telephone of O'Rourke U.S. Pat. No. D 290,005. These devices suffer from the disadvantage, among others, that they do not include a game or moving parts which are likely to attract or maintain the attention of the candy-seeker.

Portable or personal candy-dispensers, such as the PEZ dispenser, are generally simpler, lighter-weight structures which can be carried by an individual. Such portable dispensers generally do not include a significant amount of special effects or any manner of game associated with the dispenser, with the exception of shaping the dispensers to include recognizable cartoon characters or the like. As such, these portable dispensers lack more captivating special effects and games which are likely to maintain or attract a candy-seeker's interest. This disadvantage is all the more pronounced when the candy-seeker is a young child whose interest will quickly wane without an exciting special effect or game associated with the portable candy dispenser.

Accordingly, there is a need for a candy-dispensing device which includes a special effect or game which amuses the user of the device and allows for imaginative play.

There is a further need for such a device to be lightweight and portable while also being suitably captivating to hold the user's interest.

SUMMARY

Accordingly, an object of this invention is to provide a candy-dispensing device which amuses the user while also allowing for candy to be dispensed.

Further, it is an object of this invention to provide a device which is portable, easily operable, and easily refillable with candy.

According to the present invention, the foregoing and other objects and advantages are attained by a candy dispenser which has a base and a housing for holding candies connected to the base. The sidewall of the housing has a resealable opening through which the candies are dispensed. A mechanism in the candy dispenser makes the candies in the housing swirl within and relative to the housing, so that they gain centrifugal force.

According to another aspect of the invention, the mechanism which swirls the candies about the housing may include an impeller located at the bottom of the housing and an electric motor which can be selectively activated to rotate the impeller.

In accordance with still another aspect of this invention, the candy dispenser is portable and the base is formed as an elongated, hollow handle with upper and lower ends. The motor is housed in the handle and the impeller extends from the upper end of the handle. A clear dome is attached to the upper end of the handle and forms an enclosure for the candies.

In accordance with still another aspect of this invention, the clear dome includes a spout which communicates with an opening in the candy enclosure. The spout is sized so that one candy can be received in the spout when the opening is sealed.

Still other objects, advantages, and novel aspects of the present invention will become apparent in the detailed description of the invention that follows, in which the preferred embodiment of the invention is shown by way of illustration of the best mode contemplated for carrying out the invention, and by reference to the attached drawings in which:

DESCRIPTION OF THE DRAWINGS

FIG. 1 is a perspective view of a candy-dispensing device according to the present invention which shows candies swirling within the housing;

FIG. 2 is a partial view of the device of FIG. 1 showing one of the candies being dispensed;

FIG. 3 is a top plan view of the device shown in FIG. 1;

FIG. 4 is a bottom plan view of the device shown in FIG. 1;

FIG. 5 is a sectional, side view of the device shown in FIG. 1;

FIG. 6 is a sectional top view taken along line 6—6 of FIG. 5; and

FIG. 7 is a sectional top view taken along line 7—7 of FIG. 5.

DESCRIPTION

As shown in FIG. 1, a candy dispenser 21 includes a base 23 with an upper end 25 and a lower end 27. A housing 29 is attached to the upper end 25 of the base 23 and defines an enclosure suitable for holding candies 31. A spout 33 extends from the side of the housing 29 and, as best seen in FIG. 2, the spout defines a resealable opening 35 through which the candies 31 are able to be dispensed. The opening 35 in the spout 33 is releasably sealed by cap portion 37 of cap 39.

The candy dispenser 21 includes an apparatus, discussed in greater detailed below, which imparts centrifugal force to the candies 31 in the housing 29 so that the candies swirl within the enclosure relative to the housing 29. The apparatus for swirling the candies is manually activated by switch 36 which extends from the side of the base 23.

One way of operating or playing with the candy dispenser 21 is to hold the dispenser 21 generally in the position shown in FIG. 1. The user activates the switch 36 to cause the candies 31 to swirl about the inside of the housing 29. The centrifugal force imparted to the candies 31 will urge them outwardly against the inner walls of the housing 29 so that one or more of the candies 31 is projected into the opening 35 and out of the spout 33, if the spout is not covered by the cap portion 37. As the candies 31 swirl about the housing 29, the candies 31 will exit the spout 33 in a serial fashion to be dispensed into the user's hand or mouth.

When the cap portion 37 is seated over the opening 35 as shown in FIG. 1, the spout 33 includes an area 41 between the housing and the cap portion 37 which is sufficiently large to receive one of the candies 31. The area 41 allows for another method of operating the candy dispenser. In particular, when the cap portion 37 is seated in the opening 35 and when the candies are swirled within the housing, the centrifugal force causes one candy to be received into the area 41. Then, the cap portion 37 can be unseated and the candy in area 41 can be dispensed into the user's hand or mouth.

The candy-dispensing device 21 is now described in more detail with reference to FIGS. 1–7. Referring to FIG. 5, centrifugal force is imparted to the candies by means of an impeller 43 located at the bottom of the housing 29 and in communication therewith. The impeller 43 is selectively rotatable by means of an electric motor 49 powered by a battery 55. Both the battery 55 and the motor 57 are housed in compartments 59 and 61 respectively, which compartments are located within the base 23.

The motor 49 is electrically connected to the battery 55 by wires or other suitable conductors 57 which extend between terminals 63 of the battery 55 and corresponding terminals (not shown) of the motor 49. The switch 36 is interposed along the conductive path between the battery 55 and the motor 49 so that depression of the switch 36 completes the electric circuit and drives the impeller 43. Conversely, release of the switch 36 breaks the electric circuit and causes the impeller 43 to cease rotation.

Referring now to FIGS. 5 and 7, the impeller 43 includes a central shaft 51 which extends into the upper end 25 of the base 23. The shaft 51 is rotatably mounted in a bearing 62. The bearing 62, in turn, is secured to a bottom housing surface 64. The housing surface 64 is oriented generally horizontally when the dispenser 21 is in the upright position shown in FIG. 5.

The impeller 43 is operatively connected to the motor 49 by a series of gears and pinions as now described. Shaft gear 53 is mounted coaxially with the shaft 51 of the impeller 43. The shaft gear 53 engages pinion 47 which is rotatably mounted to a shaft 65. The shaft 65 is laterally spaced from the shaft 51 of the impeller 43. A connecting gear 45 is likewise axially mounted to the shaft 65 and engages motor pinion 67 which is axially mounted to motor shaft 69. In this way, it will be appreciated that rotation of the motor shaft 69 is translated into rotation of the impeller 43 by means of the gears and pinions 45, 47, 53, 67.

Although the base 23 may assume any of a variety of geometries and remain within the scope of the present invention, the base 23 is preferably a two-piece, elongated hollow member whose exterior surface 71 (FIG. 1) forms a handle for holding the dispensing device 21. The two halves 73, 75 of the base 23 are preferably formed of plastic by any suitable manufacturing method, such as by injection molding.

As best seen in FIGS. 1 and 5, bottom portion 77 of the housing 29 is integrally attached to the base 23 at its upper end 25. The bottom portion 77 terminates in an edge or lip 79. The bottom portion 77 has an inner housing surface 81 (FIG. 5) which slopes downwardly from the edge 79 toward the impeller 43. In addition to other functions, the sloping surface 81 is believed to facilitate engagement of candies 31 (FIG. 1) by the impeller 43 and also may facilitate vertical motion of the candies relative to the housing 29 when the impeller 43 is activated.

The housing 29 in this preferred embodiment includes a dome 83 extending from the bottom portion 77. The dome 83 is made of transparent material, preferably clear plastic, and has a relatively smooth inner sidewall 85 (FIG. 5). The inner sidewall 85 meets with the lip 79 of the bottom portion 77 to form the enclosure of the housing 29. In particular, the dome 83 has an annular flange 87 which is received in a corresponding recess in the lip 79. When the candies 31 are acted upon by the impeller 43, centrifugal force is imparted to the candies 31 and certain of the candies contact the inner sidewall 85 of the dome as they swirl within the enclosure of the housing 29.

The spout 33 is located in and extends generally perpendicularly from a medial portion 89 of the sidewall 85. Thus, when the dispenser 21 is in the upright position shown in FIGS. 1 and 5, the spout 33 is generally oriented horizontally.

Referring to FIG. 5, apex 91 of the dome 83 is formed into a mouth 93. The mouth 93 is sufficiently large to allow for easy loading (or unloading) of the candies 31 (FIG. 1) into (or from) the housing 29. As seen in FIGS. 1, 3 and 5, the cap 39 includes a second cap portion 95 which covers the mouth 93 of the dome 83. The cap portion 95 has an inner wall 100 and the mouth 93 has an edge portion 97, each of which are formed so that the cap portion 95 snap-fits over the mouth 93. In this preferred embodiment, the edge portions 97 include an annular flange 99 which is removably receivable into a corresponding recess in the inner wall 100 of the cap portion 95. The cap portion 95 includes a push-up tab 101 which extends outwardly from the inner wall 100 in a generally perpendicular direction. The tab 101 may be used to facilitate releasing the cap portion 95 from its closed position shown in solid lines in FIG. 5 to its released position shown in phantom lines in FIG. 5.

The releasable cap 39 thus includes two portions, the cap portion 37, which is releasably received into the opening 35 of the spout 33, and the cap portion 95, which snap-fits over the mouth 93 at the apex 91 of the dome 83. The two cap portions 37, 95 are hingedly connected to each other by means of a living hinge 103. The living hinge 103 includes a series of crenelated links 105 which are connected to form a flexible strap interconnecting the two cap portions 37, 39. The living hinge 103 terminates in a flange portion 107, and the cap portion 37 extends from one of the surfaces of the flange portion 107. The tip of the flange portion 107 terminates in a push tab 109 which facilitates the sealing and unsealing of the opening 35 by the cap portion 37.

Referring to FIG. 4, the base 23 of the candy dispenser 21 has a bottom surface 111. A door 113 is mounted in the surface 111 and is connected thereto in any suitable manner to allow it to be opened and reclosed, such as by means of hinge 115 (FIG. 5). The door 113 covers an opening which communicates with the battery compartment 59. The dimensions of the door 113 and its corresponding opening are sufficient to allow for the battery 55 to be removed and replaced as required. The door 113 includes a serrated area 117 and tabs 119 to facilitate grasping and operation of the door 113.

Referring again to FIGS. 5 and 6, the dome 83 has an annular cross section (best seen in FIG. 6). The dome 83 is mated along its lower edge to the lip 79, which has a corresponding annular plan section. The housing surface 81 forms an annular region within the dome 83 (FIG. 6), which extends downwardly toward the impeller 43 (FIG. 5).

The impeller 43 has a circular plan section best seen in FIG. 6 and is rotatably mounted at the bottom portion 77 of the housing 29 so that the impeller's centerpoint 123 is coaxial with the annular shaped cross sections of the dome 83, the housing surface 81, and the lip 79. The impeller 43 includes a circular, planar, impeller base 119 and four, triangular-shaped teeth 121 extending from the base 119. The teeth 121 are radially spaced in relation to the centerpoint 123 of the impeller 43.

The teeth 121 are pyramid-shaped with apexes 125 located at the perimeter of the impeller as best seen in FIG. 5. Each of the teeth 121 thus has an upper edge 127 which slopes upwardly from the centerpoint 123 of the base 119 toward the apex 125 at the perimeter of the impeller 43. Each of the teeth 121 also has one side 129 which is substantially orthogonal to the impeller base 119, and another side 131 which is inclined relative to the impeller base 119. These sides 129, 131 share a common lower apex at or near the centerpoint 125 and extend upwardly from the impeller base 119 along a common edge corresponding to the upper edge 127.

As best seen in FIG. 6, for each of the teeth 121, the inclined side 131 extends between the upper edge 127 and the impeller base 119 over a selected radial segment of the impeller 43. The size of such radial segment depends on the angle of inclination of the inclined side 131, as well as the distance of the apex 125 from the impeller base 119. In this preferred embodiment, each of the sides 131 inclines at approximately 45° relative to the corresponding orthogonal side 129 and extends over a radial segment of about 41°.

The teeth 121 are arranged radially over the impeller base 119 so that the upper edges 127 of opposing pairs of the teeth 121 extend opposite each other. In other words, the upper edges 127 of opposing pairs of the teeth 121 extend radially from the centerpoint 123 in directions which are 180° from each other. Two pairs of the teeth 121 are thus arranged about the impeller 119. The inclined sides 131 of the teeth 121 face in the same direction and the orthogonal sides 129 face in the opposite direction in relation to rotation of the impeller 43 about its centerpoint 123. Between each of the teeth 121, the impeller base 119 has a planar segment 133 which extends about 49°.

The operation and use of the candy dispenser according to the present invention is readily apparent from the above description. The housing 29 is filled with the candies 31, preferably by releasing the tab portion 95 from the mouth 93 as shown by the phantom lines in FIG. 5. After the candies 31 are placed in the housing 29, the cap portion 95 is snap-fit back over the mouth 93. The candies 31, of course, could also be loaded into the housing 29 through the spout 33, but since the opening 35 is generally smaller than the mouth 93, such a method of loading would be more time-consuming.

The candies 31 can be dispensed with or without activating the impeller 43. It will also be appreciated that, since imaginative play may be involved in the use of this invention, the methods of using the invention are not limited necessarily to those described herein but only by the imagination of the user.

One way of operating the device 21 involves the user holding the handle portion of the base 23 so that the dispenser 21 is in the upright position shown in FIGS. 1 and 5. The cap portion 37 is removed from the opening 35, preferably by applying outwardly directed pressure at the tab 109. The cap portion 37 remains connected to the dispenser 21 because the cap portion 37 is hingedly connected to the other cap portion 95 which is seated over the mouth 93. In this way, the cap 39 is not disassociated with the dispenser 21 even when the cap portion 37 is removed from the spout 33.

Still holding the dispenser 21 in the upright position, the user depresses the button 36 to activate the motor 49. The motor 49 in turn is operatively connected to the impeller 43 so that it rotates in the clockwise direction indicated by the arrow A. The impeller 43 rotates so long as the switch 36 is depressed, completing the electric circuit between the battery 55 and the motor 49. When the switch 36 is released, the impeller ceases rotation and the candies cease swirling about the housing 85 shortly thereafter.

The mass of candies 31 is generally on top of the impeller 43 when the device 21 is upright. Certain of the candies 31 are either wholly or partially interengaged with the teeth 121 of the impeller 43. When the impeller 43 rotates, it imparts centrifugal force, either directly or indirectly, to substantially all of the candies 31 in the housing 29. The candies swirl about the inner sidewall 85 of the housing 29 as shown in FIG. 1. As the candies are forced to swirl along the sidewall 85, the paths of some of the candies will cross over the opening 35 of the spout 33. The number of candies 31 which cross over the opening 35 depends on the volume of candies 31 in the housing and the amount of time they are swirled within the housing 29.

Since the spout 33 extends outwardly from the sidewall 85, the centrifugal force will dispense those candies 31 which cross over the opening 35 out through the spout 33. The size of the candies 31 relative to the size of the opening 35 also affects how many and in what manner the candies 31 pass through the spout 33 under the centrifugal force imparted to them. In this embodiment, when the swirling candies pass over the opening 35, they will be serially dispensed through the spout 33.

When centrifugal force is imparted to the candies 31, the continuous and relatively smooth inner sidewall 85 allows the mass of candies to spread out against the inner sidewall 85. As the candies spread out, the vertical level of the candies relative to the housing 29 tends to rise. In particular, the centrifugal force urges more of the candies 31 away from the center of the housing 29 and against the inner sidewall 85. Since fewer of the candies are in the center of the housing, the candies are forced to spread out against the sidewall 85. Since the spreading out is limited by the bottom portion 77 of the housing 29, the candies generally spread vertically upward.

The structure of the candy dispenser 21 takes advantage of this vertical rise of the candy level when it is operated. The housing 29 can be filled with a sufficient number of the candies 31 so that the enclosure is filled with candies to a vertical fill level near but below the vertical location of the opening 33. When the impeller swirls this amount of candies, the candies will spread out against the inner wall 85 as discussed above. The vertical level of the candies 31 will rise a sufficient amount so that candies toward the top will pass over the opening 35 and exit the spout 33 to be dispensed.

The inclined sides 131 of the teeth 121 face forward as the impeller 43 rotates in the direction indicated by the arrow A. The inclined sides 131 and the upwardly sloping housing surfaces 81 impart a vertical force component to the candies 31 when the impeller 43 rotates. This vertical force component imparted to the candy causes them to "pop" upward in relation to the housing. This vertical force component is also believed to contribute to the general vertical rise in a level of the candies 31, discussed above, when the impeller 43 is activated.

Another dispensing operation made possible by the above described invention involves activating the impeller to swirl the candies 31 while the cap portion 37 is inserted into the spout 33. When the cap portion 37 is thus inserted, the centrifugal force on the candies feeds candies into the spout 33 only until the spout area 41 is filled. In this case, a single one of the candies 31 fills the area 41 as shown in FIG. 1. Once the area 41 is filled, the switch 36 can be released, thus deactivating the impeller. The cap portion 37 is then removed and the candy or candies in the area 41 are dispensed by slightly tipping the spout 33 from its horizontal position.

The device 21 can be refilled with candies by removing the cap portion 95 as described previously. Removal of the cap portion 95 will not fully disassociate the cap 39 from the device 21, so long as the cap portion 37 is inserted into the spout 33.

There is, of course, no requirement for the device 21 to be in the upright position shown in FIGS. 1 and 5. The impeller 43 can be activated to swirl the candies in any orientation, so long as some of the candies engage with the teeth of the impeller 43. Likewise, the impeller can be activated merely to swirl the candies when the user wishes to engage in imaginative or attention-getting play without dispensing of the candies. In addition, any amount of candies 31 may be placed in the housing 29 according to the present invention. Of course, when there are fewer of the candies 31, it will be more difficult to dispense them merely through centrifugal force than when there are a greater number. The candies 31 may also be dispensed through the spout 33 by appropriately tipping the device 21 without activating the impeller 43.

The candy dispenser 21 is preferably sized to be portable by the user. As such, suitable dimensions for the base 23 are about 100 millimeters from its lower end 27 to its upper end 25, with a width between opposite sides of about 28 millimeters. The impeller 43 has a circular plan section of about 28 millimeters and the apex 91 of the impeller teeth is about 9 millimeters above the impeller base 119.

The bottom portion 77 of the housing 29 flares outwardly from the upper end of the base 23 and therefore has a larger cross-sectional diameter than the base 23. A suitable height for the housing 29 is about six centimeters measured from the bottom portion 77 to the upper edge of the mouth 93.

The spout 33 extends generally horizontally from the sidewall 85 at a location which is about 4 centimeters above the bottom portion 77, as measured from the lowermost point of the bottom portion 77 to the centerpoint of the spout 33. The inner diameter of the spout 33 is about 1 centimeter, and the inner diameter of the mouth 93 at the apex 91 of the dome 83 is between 2 and 3 centimeters.

Alternative embodiments of the present invention may vary the size, interconnection or configuration of certain of the structural elements described above. For example, the size and location of the impeller 43 may be varied to impart greater or lesser centrifugal force to the candies 31. Likewise, the location of the spout 33 may be shifted to be vertically higher or lower in relation to the bottom portion 77 of the housing 29.

Instead of the cap 39, suitable alternative means for sealing the spout 33 and the mouth 93 may also be employed, such as a hinged or sliding door. The exact geometry of the spout 33 may be varied to a curved shape or a non-horizontal orientation. The inner sidewall 85, while smooth in this embodiment, may alternately be patterned or shaped in such a way as to alter the path of the swirling candies 31.

In further alternative embodiments, the base 23 may be configured with a foot or other suitable structure to allow the dispensing device 21 to be set upon a horizontal surface to orient the dome 83 in an upright position and to allow operation while resting on such horizontal surface.

In addition to the advantages apparent from the above description, the dispensing device according to the present invention may be configured so as to be portable by the user. At the same time, the device has the advantage of incorporating a stimulating special effect by causing the candies 31 to swirl in relation to the clear surface of the dome.

As still another advantage, the dispensing device has a spout located to dispense certain of the candies 31 which have been subjected to centrifugal force by the impeller.

As yet another advantage, the act of dispensing candy has been rendered more captivating and visually interesting for the user.

The cap of the present invention has the advantage of being in two portions, one for covering the spout, the other for covering the mouth. When the cap is unsealed from one or the other of these openings, it remains associated with the dispensing device and thus has the advantage of being less easily misplaced.

While the present invention has been described with reference to the preferred embodiment thereof, illustrated in the accompanying drawings, various changes and modifications can be made by those skilled in the art without departing from the spirit and scope of the present invention. Therefore, the appended claims are to be construed to cover equivalent structures.

What is claimed is:

1. A candy dispenser comprising:
   a base;
   a housing for holding candies, the housing connected to the base and having an inner sidewall;
   a resealable opening in the sidewall through which the candies may pass; and
   means for imparting centrifugal force to the candies such that at least some of the candies confront the inner sidewall and rotate therearound.

2. The candy dispenser of claim 1, wherein the means for imparting centrifugal force comprises an impeller located at the bottom of the housing and means for selectively rotating the impeller.

3. The candy dispenser of claim 2, wherein the rotating means comprises an electric motor operatively connected to the impeller and a switch in the base to selectively activate the motor.

4. The candy dispenser of claim 1, wherein the base comprises an elongated hollow member, the hollow member having a motor compartment and a battery compartment therein, and wherein one end of the member is connected to the housing and the other end of the member has a door to access the battery compartment.

5. The candy dispenser of claim 4, wherein the exterior surface of the hollow member comprises a handle for holding the dispenser and the dispenser is sized to be portable.

6. The candy dispenser of claim 2, wherein the impeller includes a substantially planar, impeller base and a plurality of triangular-shaped teeth extending from the impeller base into the housing.

7. The candy dispenser of claim 6, wherein the teeth have first sides which are substantially orthogonal to the impeller base and second sides inclined relative to the impeller base, the first and second sides intersecting each other at corresponding apexes of the teeth.

8. The candy dispenser of claim 7, wherein the teeth of the impeller are arranged so that, when the impeller is rotated, the inclined sides face forward.

9. The candy dispenser of claim 1, wherein the housing includes a clear dome.

10. The candy dispenser of claim 9, wherein the housing includes a bottom portion with an outer edge, and the dome has a sidewall which mates with the outer edge, and wherein the bottom portion slopes downwardly from the outer edge toward the impeller.

11. The candy dispenser of claim 9 further comprising a releasable cap, wherein the dome includes a mouth and the releasable cap covers the mouth of the dome and the opening in the sidewall.

12. The candy dispenser of claim 11, wherein the releasable cap comprises a first cap portion sized to cover the mouth and a second cap portion sized to cover the opening, the two cap portions being hingedly connected to each other.

13. The candy dispenser of claim 12, wherein the housing includes a spout in communication with the opening in the sidewall, the spout sized to receive one of the candies therein when the opening is sealed.

14. A portable candy dispenser comprising:
   an elongated hollow handle with upper and lower ends;
   a selectively activatable motor housed in the handle;
   an impeller operatively connected to the motor and extending from the upper end of the handle;
   a clear dome attached to the upper end of the handle for storing candies, the impeller located substantially at the bottom of the dome, the impeller adapted to impart centrifugal force to candies in the dome when the impeller is activated;
   an opening through the dome for dispensing the candies, the opening positioned in the dome so that, when the dispenser is held in a predetermined position and centrifugal force is imparted to the candies, at least one candy passes through the opening for dispensing.

15. The candy dispenser of claim 14, wherein the opening is located in a medial portion of the dome so that, when the enclosure is filled with candies to a level near but below the location of the opening, at least one candy is dispensed through the opening after the impeller is activated.

16. The candy dispenser of claim 14, wherein the impeller has a shaft which extends into the handle from the upper end, and the shaft is operatively connected to the motor.

17. The candy dispenser of claim 14 and a battery located in the handle to power the motor.

18. The candy dispenser of claim 17, wherein the impeller shaft, motor, and battery are substantially coaxial with the longitudinal axis of the handle.

19. A portable candy dispenser comprising:
   a base which includes an elongated, hollow member and portions defining a handle;
   a clear dome having a sidewall connected to the base to form an enclosure for holding a volume of the candies, the dome having an apex with a mouth defined therein;
   an impeller having a plurality of teeth in communication with the enclosure, the teeth having inclined sides at least partially engaging the volume of the candies when the dome is substantially upright;
   a spout located in the sidewall and defining an opening in communication with the enclosure, the spout extending generally horizontally when the dome is substantially upright;
   a cap having a first cap portion for covering the spout and a second cap portion for covering the mouth, the two cap portions being hingedly connected, the spout having an area sufficiently large to receive at least one of the candies in the area when the spout is covered by the first cap portion;
   means for selectively rotating the impeller to impart sufficient centrifugal force to the volume of the candies to cause at least one of the candies to enter the spout when the dome is upright.

* * * * *